United States Patent
Kameta et al.

(10) Patent No.: US 6,372,038 B1
(45) Date of Patent: Apr. 16, 2002

(54) CONCRETE COMPOSITION FOR OVERLAY METHOD AND HARDENED PRODUCT THEREFROM

(75) Inventors: Shoichi Kameta, Chiba; Ryoichi Sato, Higashihiroshima; Yoichi Abe, Narita; Makoto Tanimura, Chiba; Tetsuro Niinuma, Sakura; Hidemi Nakamura, Sakura; Shoichi Ogawa, Sakura, all of (JP)

(73) Assignee: New Tokyo International Airport Authority, Chiba (JP)

( * ) Notice: Subject to any disclaimer, the term of this patent is extended or adjusted under 35 U.S.C. 154(b) by 0 days.

(21) Appl. No.: 09/446,851

(22) PCT Filed: Apr. 23, 1999

(86) PCT No.: PCT/JP99/02168

§ 371 Date: Dec. 28, 1999

§ 102(e) Date: Dec. 28, 1999

(87) PCT Pub. No.: WO99/55635

PCT Pub. Date: Nov. 4, 1999

(30) Foreign Application Priority Data

Apr. 28, 1998 (JP) .......................................... 10-119086

(51) Int. Cl.$^7$ ................................................. C04B 7/02
(52) U.S. Cl. ...................... 106/724; 106/728; 106/819; 106/823
(58) Field of Search ................................ 106/724, 728, 106/819, 823

(56) References Cited

U.S. PATENT DOCUMENTS 4,402,749 A * 9/1983 Hall et al.
4,653,956 A * 3/1987 Lang ........................... 404/28

FOREIGN PATENT DOCUMENTS

| JP | 53-85931 | 7/1978 |
| JP | 3-37146 | 2/1991 |
| JP | 5-194003 | 8/1993 |
| JP | 8-277156 | 10/1996 |

OTHER PUBLICATIONS

Patent Abstracts of Japan; Publication No. 05194003, Publication Date Aug. 3, 1993.

Patent Abstracts of Japan; Publication No. 08277156; Publication Date: Oct. 22, 1996.

Japan Concrete Engineering Association; Concrete Manual (Second Edition);Gihodo; dated Feb. 15, 1996; 5 pages.

Walter D. Munn; "Bonded Concrete Overlays Resurface Busy Freeway"; Highway & Heavy Construction, Oct. 1989; pp. 58–60.

* cited by examiner

Primary Examiner—Paul Marcantoni
(74) Attorney, Agent, or Firm—Rosenthal & Osha L.L.P.

(57) ABSTRACT

The invention provides a concrete composition used in an overlay method of construction which is used for improving a deteriorated paved surface and/or a paved layer, the concrete composition comprising a cement, a shrink-reducing agent, an expanding agent, a high performance AE water-reducing agent and an AE agent, wherein the cement is a normal portland cement and/or a low heat portland cement. The concrete composition used in an overlay method of construction is rich in the bonding strength between an existent paved layer and a new surface layer and is resistant to exfoliation, cracking of a new surface layer and wear.

12 Claims, 5 Drawing Sheets

Relation between the amount of a shrink-reducing agent and compressive strength(normal)

Relation between the amount of a shrink-reducing agent and compressive strength (normal)

Relation between the amount of a shrink-reducing agent and compressive strength (low-heat)

Relation between the amount of a shrink-reducing agent and shrinkage factor(normal)

Relation between the amount of a shrink-reducing agent and shrinkage factor(low-heat)

Relation between the amount of an expanding agent and compressive strength(normal)

Relation between the amount of an expanding agent and compressive strength(low-heat)

Relation between the amount of an expanding agent and volume of expansion (low-heat)

Relation between the amount of an expanding agent and volume of expansion (normal)

Relation between the amount of a retardant and compressive strength(normal)

Relation between the amount of a retardant and volume of expansion(normal)

CONCRETE COMPOSITION FOR OVERLAY METHOD AND HARDENED PRODUCT THEREFROM

TECHNICAL FIELD

The present invention relates to a concrete composition for an overlay method of construction and also to a cured product thereof.

BACKGROUND ART

An overlay method of construction using stylfiber reinforced concrete (SFRC) has been proposed as a method of construction for repairing, for instance, a landing strip. In this overlay method of construction, the surface of a pavement is cut off by a desired thickness, the cut surface is treated by shotblasting in which a hard ball is struck against the cut surface, and a newly paved plane (surface layer) is formed on the cut surface.

An overlay method of construction not by means of surface treatment using only shotblasting in which a hard ball is struck against the cut surface but by means of the following surface treatment is proposed in Japanese Patent Application Laid-Open (JP-A) No. H9-71902. In this overlay method of construction, first a water jet which jets high pressure water is used to form relatively large irregularities (uneven surface) on a deteriorated paved surface and/or paved layer and in succession, shotblasting in which small grains are jetted is used to form small irregularities on the above surface with large irregularities thereby forming a complex irregular structure having relatively small irregularities further on a surface with relatively large irregularities and on the complex irregular structure, a newly paved plane (surface layer) is formed.

The invention described in JP-A No. H9-71902 solves the problem that only the process in which the surface of a pavement is cut and a newly paved plane (surface layer) is formed on the cut surface results in the fact that bonding between the existent paved layer and the new surface layer is easily damaged by repetitive action of compressive stress and tensile stress. In the invention, therefore, an irregular structure is formed on the surface of an existent paved layer and a new surface layer is fitted to the irregular structure to increase the bonding strength between the existent paved layer and the new surface layer thereby extending the life of the repaired paved plane.

As aforementioned, the invention proposed (or described) in JP-A No. H9-71902 has an intention to improve the bonding strength between an existent paved layer and a new surface layer by fitting of the irregularities to each other.

However, it comes to be understood that only insufficient bonding strength is obtained only by the fitting of the irregularities in the method proposed in JP-A No. H9-71902.

To state in more detail, it has been found that even if the surface treating technique proposed in JP-A No. H9-71902 is adopted to form a new surface layer on an existent paved layer, on which irregularities are formed, by using a conventional concrete composition, the bonding strength between the existent paved layer and the new surface layer is weak depending on the composition of concrete forming the new surface layer and on the detail of the cured product.

DISCLOSURE OF THE INVENTION

A first object of the present invention is to provide a concrete composition for an overlay method of construction which gives strong bonding strength between an existent paved layer and a new surface layer and is resistant to exfoliation and also to provide its cured product.

A second object of the present invention is to provide a concrete composition for an overlay method of construction which is resistant to cracking and wear of a new surface layer formed on an existent paved layer and also to provide its cured product.

A concrete composition for an overlay method of construction according to the present invention is a concrete composition used in an overlay method of construction for improving a deteriorated paved surface and/or a paved layer, the concrete composition comprising a cement, a shrink-reducing agent, an expanding agent, a high performance AE water-reducing agent and an AE agent, wherein the cement is a low heat portland cement.

A concrete composition for an overlay method of construction according to the present invention is a concrete composition used in an overlay method of construction for improving a deteriorated paved surface and/or a paved layer, the concrete composition comprising a cement, a shrink-reducing agent, an expanding agent, a high performance AE water-reducing agent, an AE agent and a retardant, wherein the cement is a normal portland cement.

Particularly, the concrete composition for an overlay method of construction according to the present invention attains the first and second objects when it is used in an overlay method of construction in which a water jet which jets high pressure water is used to form relatively large irregularities (uneven surface) on a deteriorated paved surface and/or paved layer and in succession, shotblasting in which small grains are jetted is used to form relatively small irregularities on the above surface with large irregularities thereby forming a complex irregular structure having relatively small irregularities further on a surface with relatively large irregularities and on the complex irregular structure, a newly paved plane (surface layer) is formed.

A cured product of the concrete composition for an overlay method of construction according to the present invention satisfies at the same time the following requirements: a compressive strength larger than a prescribed value and an expansion volume greater than a prescribed value, thereby attaining the first and second objects.

BEST MODES FOR CARRYING OUT THE INVENTION

Figure 1:
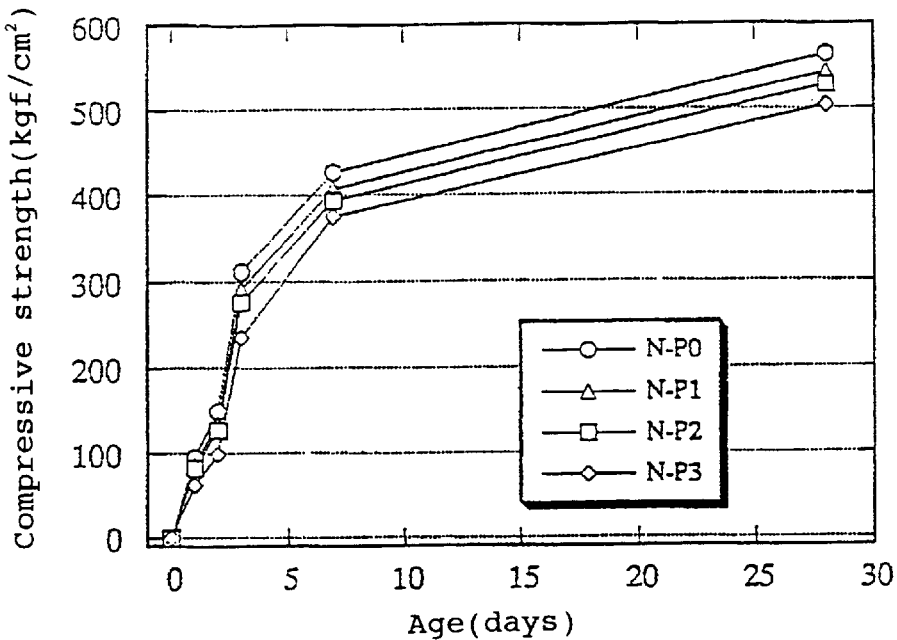
FIG. 1 is a graph showing a variation in the compressive strength corresponding to the passage of the age of a concrete composition using normal portland cement in each amount of a shrink-reducing agent to be used.

The concrete composition for an overlay method of construction according to the present invention is a concrete composition used in an overlay method of construction for improving a deteriorated paved surface and/or a paved layer, the concrete composition comprising a cement, a shrink-reducing agent, an expanding agent, a high performance AE water-reducing agent and an AE agent, wherein the cement is a low-heat portland cement.

The concrete composition for an overlay method of construction according to the present invention is a concrete composition used in an overlay method of construction for improving a deteriorated paved surface and/or a paved layer, the concrete composition comprising a cement, a shrink-reducing agent, an expanding agent, a high performance AE water-reducing agent, an AE agent and a retardant, wherein the cement is a normal portland cement.

The concrete composition for an overlay method of construction according to the present invention is a concrete composition used in an overlay method of construction in which a water jet which jets high pressure water is used to form relatively large irregularities on a deteriorated paved surface and/or paved layer and in succession, shotblasting in which small grains are jetted is used to form relatively small irregularities on the above surface with large irregularities thereby forming a complex irregular structure having relatively small irregularities further on a surface with relatively large irregularities and on the complex irregular structure, a newly paved plane (surface layer) is formed.

The concrete composition for an overlay method of construction according to the present invention may comprise an aggregate and water in addition to the above components.

Next, the reason why, other than a cement, at least a shrink-reducing agent, an expanding agent, a high performance AE water-reducing agent and an AE agent are included as the components of the concrete composition of the present invention will be hereinafter explained.

First, the shrink-reducing agent is used to reduce the shrinkage strain of a cured product. The cracking of the cured product can be prevented by reducing the shrinkage strain of the cured product thereby preventing a reduction in the strength of the cured product. Moreover, the new surface layer can be exfoliated from the existent paved layer with difficulty.

As the shrink-reducing agent, a glycol-type shrink-reducing agent or a polyether-type shrink-reducing agent may be used. Among these agents, a shrink-reducing agent formed of a glycol-type compound is preferred. As to the amount of the shrink-reducing agent to be used, when the amount of the shrink-reducing agent is too small, a shrink-reducing effect is produced with difficulty whereas when the amount is excessive, the compressive strength of a cured product tends to be reduced. It is therefore desirable that the amount based on 100 parts by weight of cement is designed to be in a prescribed range.

However, the volume of shrinkage cannot be made zero even if the shrink-reducing agent is used. The concrete composition of the present invention, therefore, uses an expanding agent in combination of the shrink-reducing agent to prevent the shrinkage more effectively. It is needless to say that the use of only the expanding agent increases the degree of a reduction in the compressive strength of a cured product and is hence undesirable. Specifically, only by the use of a combination of the shrink-reducing agent and the expanding agent, the concrete composition of the present invention can prevent the shrinkage of a cured product more effectively, thereby avoiding cracking and exfoliation and further securing the strength.

As the expanding agent, lime-type expanding agents (e.g., XPAN K (trademark), manufactured by Chichibu Onoda Co., Ltd.) and etholinegite-type expanding agents (e.g., Asanodipcal (trademark), manufactured by Nihon Cement Co., Ltd.) may be used. As to the amount of such an expanding agent, when the amount of the expanding agent is too small, an expansion effect is obtained with difficulty whereas when the amount is excessive, there is a fear of harmful effects due to after-expansion and the compressive strength tends to be reduced. It is therefore desirable to use the expanding agent in an amount falling within a prescribed range.

The reason why the high performance AE water-reducing agent is used is that the use of the high performance AE water-reducing agent can reduce the amount of water while high fluidity is maintained and hence the shrinkage strain of a cured product can be reduced. As a result, the cracking of the cured product can be prevented, a reduction in the strength of the cured product and further a new surface layer can be exfoliated from an existent paved layer with difficulty.

As the high performance AE water-reducing agent, a polycarboxylic acid type high performance AE water-reducing agent (e.g., Coreflow-NP-5R (trademark), manufactured by Chichibu Onoda Co., Ltd.) and naphthalene-type high performance AE water-reducing agent (e.g., SP-9R (trademark), manufactured by Pozolith) maybe used. Among these agents, a high performance AE water-reducing agent comprising a carboxylic acid-type compound is preferable. As to the amount of such a high performance AE water-reducing agent, when the amount of the high performance AE water-reducing agent is too small, the amount of water to be used cannot be so much reduced and hence the shrinkage-reducing effect is hardly produced. On the contrary, when the amount is excessive, the compressive strength of a cured product tends to be greatly reduced. It is therefore desirable to use it in an amount falling within a prescribed range for 100 parts by weight of the cement.

The reason why a high performance AE water-reducing agent comprising a carboxylic type compound is preferable as the high performance AE water-reducing agent and a shrink-reducing agent comprising a glycol-type compound is preferable as the shrink-reducing agent is that these agents are compatible with each admixture, are reduced in the dispersion of the amount of air and are stable. It is also because such an economical effect that the AE agent explained below may be contained only in a small amount.

The reason why the AE agent is used is that the use of the AE agent makes it possible to form a proper degree of gaps in the cured product. As a result, the freeze resistance and fusion resistance of the cured product are promoted, a deterioration by cracking can be prevented, a reduction in the strength of the cured product can be prevented and further a new surface layer can be exfoliated from an existent paved layer with difficulty. The AE agent is therefore an essential component in the concrete composition of the present invention.

As the AE agent, anionic AE agents (e.g., CAE-20 (trademark), manufactured by Chichibu Onoda Co., Ltd.), 303A (trademark), manufactured by Pozolith and rosin type AE agents (e.g., CAE-30 (trademark), manufactured by Chichibu Onoda Co., Ltd.) may be used. As to the amount of the AE agent to be used, when the amount of the AE agent is too small, the above characteristics can be exhibited with difficulty whereas when the amount is excessive, the amount of voids is increased and hence the compressive strength of the cured product is reduced and the degree of binding of a new surface layer with an existent paved layer tends to be reduced. It is preferable to use the AE agent in an amount falling within a prescribed range based on 100 parts by weight of cement.

The reason why the cement used in the present invention is selected from the group consisting of normal portland cement and low heat portland cement is from curing and working points of view. Usually, when works are executed at not high temperatures in season from autumn to spring via winter, general purpose normal portland cement is used. On the other hand, when works are executed at high temperatures in season from spring to autumn via summer, it is preferable to use low-heat portland cement having good workability and curability even in a high-temperature circumstance.

The reason why a retardant is further contained in the concrete composition for an overlay method of construction according to the present invention when the cement used in the present invention is normal portland cement is as follows. Specifically, it is because when comparing normal portland cement with low heat portland cement, normal portland cement is not cured gently in the initial stage and hence a retardant is used to make the curing rate slow to easy expansion.

Examples of the retardant used in the present invention include phosphonic acid type retardants (Delvocreat (trademark), manufacture by Pozolith) and lignin type retardants (No. 89 (trademark), manufactured by Pozolith). As for the amount of such a retardant, when the amount of the retardant is too small, an expansion effect is produced with difficulty whereas when the amount is excessive, the curing rate is slow and hence a release after the execution of the working is too delayed. It is therefore desirable to use the retardant in an amount falling within a prescribed range based on 100 parts by weight of normal portland cement.

When the slump value of the concrete composition for an overlay method of construction according to the present invention is too small, the fluidity of the composition is impaired and the flow of the composition into an irregular plane of the surface is not good, reducing binding unity that much more. On the contrary, when the slump value is too large, the concrete composition is too softened, causing sagging of the composition when it is applied to a slope. In addition, when the volume of air is too small, the freeze and fusion resistances are impaired, causing cracking. On the other hand, when the volume of air is too large, a contact area with an irregular plane of the surface is reduced, reducing binding unity that much more. It is desirable that the slump value of the concrete composition for an overlay method of construction according to the present invention 90 minutes after the composition is tempered fall within a prescribed range (in the case of examining according to JIS A 1101) excluding the above too small and too large value ranges. It is also desirable that the volume of air fall within a prescribed range (in the case of examining according to JIS A 1128) excluding the above too small and too large value ranges. Specifically, when the slump value of the concrete composition for an overlay method of construction according to the present invention 90 minutes after the composition is tempered falls within a prescribed range and the volume of air falls within a prescribed range, the bonding strength between an existent paved layer and a new surface layer is more improved, cracking is caused with difficulty and further the workability is bettered.

Here, the JIS standard cited in the present invention will be explained.

"JIS A 1101" is a Japanese Industrial Standard concerning "Test method of the slump of concrete". "JIS A 1128", is a Japanese Industrial Standard concerning "Test method of air volume in fresh concrete by using pressure-air chamber pressure method". "JIS A 1108" is a Japanese Industrial Standard concerning "Test method of compressive strength". "JIS A 6202" is a Japanese Industrial Standard concerning "Expanding agent for concrete", wherein a test method for the volume of expansion of concrete is described.

Preferably a cured product produced by curing the concrete composition for an overlay method of construction according to the present invention attains a compressive strength and volume of expansion greater than each prescribed value at the same time. To state in more detail, it is preferable to attain 80 kgf/cm$^2$ or more (in the case of examining according to JIS A 1108) in the compressive strength of a cured product of three-days age and 200 $\mu$m or more (in the case of examining according to JIS A 6202) in the volume of expansion of a cured product of seven-days age. Particularly in the case of carrying out water-curing when the composition is cured at temperatures above 20° C., it is preferable to attain 100 kgf/cm$^2$ or more (in the case of examining according to JIS A 1108) in the compressive strength of a cured product of three-days age and to attain a prescribed value as high as 200 $\mu$m or more (in the case of examining according to JIS A 6202) in the volume of expansion of a cured product of seven-days age.

The reason why preferably the strength of the cured product of three-days age according to the concrete composition of the present invention is 80 kgf/cm$^2$ or more or 100 kgf/cm$^2$ or more and particularly 100–400 kgf/cm$^2$ is that a release after construction is finished within three days. Also, the reason why preferably the volume of expansion of the cured product of seven-days age according to the concrete composition of the present invention is 200 $\mu$m or more and particularly 200–500 $\mu$m (in the case of examining according to JIS A 6202) is that the cured product of the concrete composition of the present invention is prevented from shrinking, cracking and exfoliating and that the strength is secured.

Using various data obtained from the tests of the test samples of concrete compositions produced by changing each amount of various structural elements (structural agents) of the present invention, the concrete composition for an overlay method of construction according to the present invention and its cured product will be explained in more detail.

Firstly, to confirm the effect of the shrink-reducing agent, the concrete test samples with each composition shown in the following Table 1 were produced without using the expanding agent (E) (E=0 kg/m$^3$).

Figure 2:
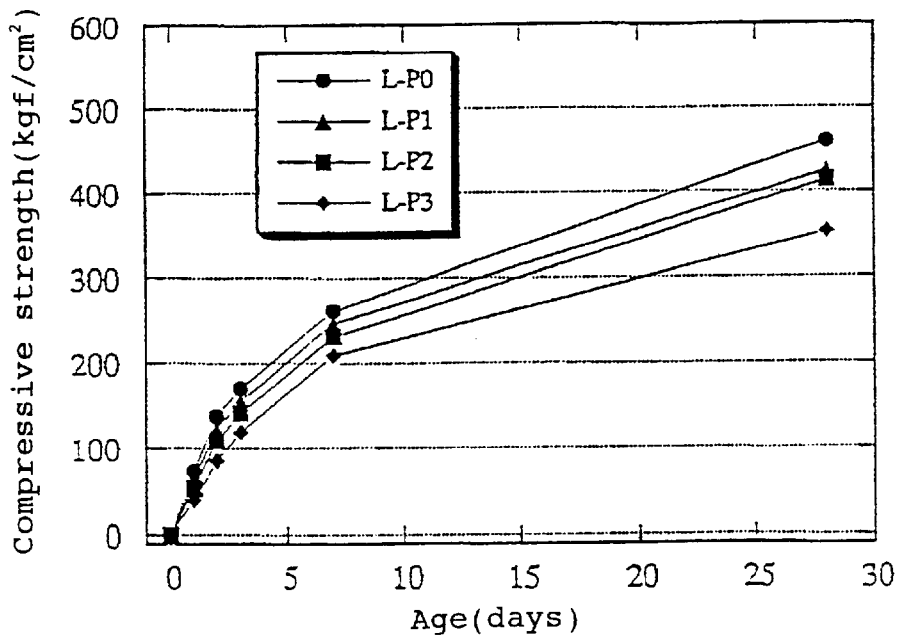
FIG. 2 is a graph showing a variation in the compressive strength corresponding to the passage of the age of a concrete composition using low-heat portland cement in each amount of a shrink-reducing agent to be used.
Figure 3:
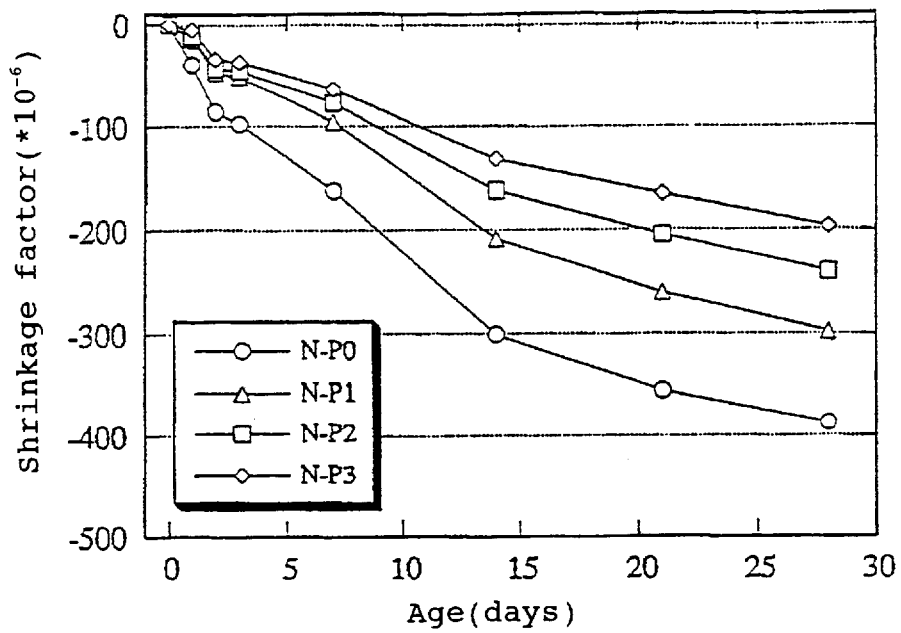
FIG. 3 is a graph showing a variation in the volume of shrinkage corresponding to the passage of the age of a concrete composition using normal portland cement in each amount of a shrink-reducing agent to be used.
Figure 4:
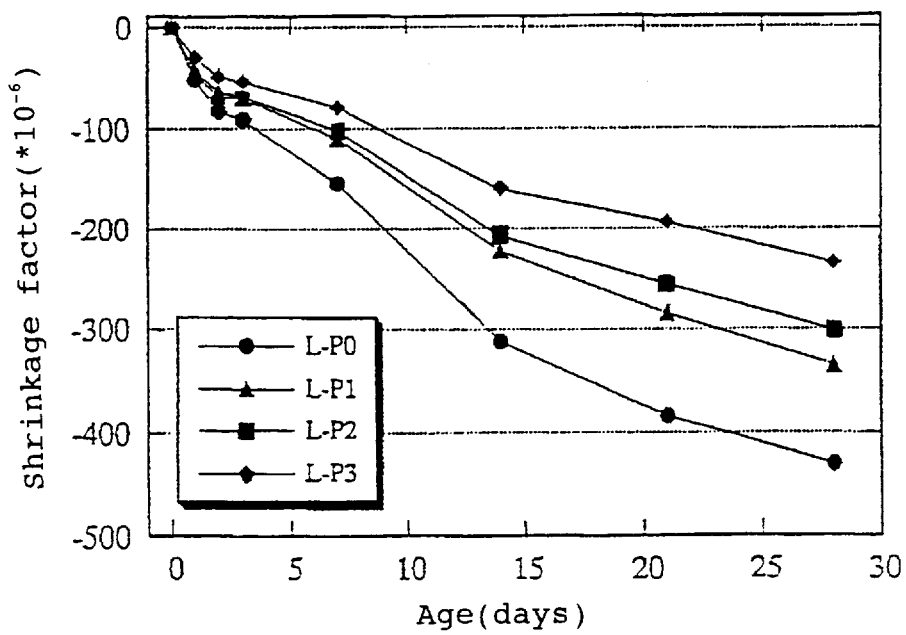
FIG. 4 is a graph showing a variation in the volume of shrinkage corresponding to the passage of the age of a concrete composition using low-heat portland cement in each amount of a shrink-reducing agent to be used.

The concrete test samples represented by N-P0 to N-P3 in Table 1 contains the shrink-reducing agent (P) in amounts of 0 part by weight (B×0%), 1 part by weight (B×1%), 2 parts by weight (B×2%) and 3 parts by weight (B×3%) respectively in 100 parts (B) by weight of normal portland cement. The concrete test samples represented by L-P0 to L-P3 in Table 1 contains the shrink-reducing agent (P) in amounts of 0 part by weight (B×0%), 1 part by weight (B×1%), 2 parts by weight (B×2%) and 3 parts by weight (B×3%) respectively in 100 parts (B) by weight of low-heat portland cement.

amount of the shrink-reducing agent (P) to be used. FIG. 2 is a graph showing a variation in the compressive strength corresponding to the passage of the age of a concrete composition using low-heat portland cement in each amount of the shrink-reducing agent (P) to be used. FIG. 3 is a graph showing a variation in the amount of shrinkage corresponding to the passage of the age of a concrete composition using normal portland cement in each amount of the shrink-reducing agent (P) to be used. FIG. 4 is a graph showing a variation in the volume of shrinkage corresponding to the passage of the age of a concrete composition using low-heat portland cement in each amount of the shrink-reducing agent (P) to be used.

It is found from these FIGS. 1–4 that the compressive strength and volume of shrinkage of the concrete composition vary corresponding to the amount of a shrink-reducing agent which is represented by the symbol P in Table 1.

For example, the compressive strength and also shrinkage factor of the concrete composition are more increased in the case of using 2 parts by weight of the shrink-reducing agent (P) than in the case of using 3 parts by weight of the

TABLE 1

| Test sample | Cement Type | W/B (%) | s/a (%) | Unit amount (kg/m$^3$) B | | | | | Admixutre (B × %) | | | |
|---|---|---|---|---|---|---|---|---|---|---|---|---|
| | | | | W | C | E | S | G | P | 5R | D | AE |
| N-P0 | Normal | 40.0 | 40.5 | 132 | 330 | 0 | 762 | 1137 | 0 | 0.4 | 0 | 0.4 |
| N-P1 | Normal | 40.0 | 40.5 | 132 | 330 | 0 | 762 | 1137 | 1.0 | 0.4 | 0 | 0.4 |
| N-P2 | Normal | 40.0 | 40.5 | 132 | 330 | 0 | 762 | 1137 | 2.0 | 0.4 | 0 | 0.2 |
| N-P3 | Normal | 40.0 | 40.5 | 132 | 330 | 0 | 762 | 1137 | 3.0 | 0.4 | 0 | 0.2 |
| L-P0 | Low-heat | 40.0 | 40.5 | 132 | 330 | 0 | 764 | 1140 | 0 | 0.5 | 0 | 0.3 |
| L-P1 | Low-heat | 40.0 | 40.5 | 132 | 330 | 0 | 764 | 1140 | 1.0 | 0.5 | 0 | 0.2 |
| L-P2 | Low-heat | 40.0 | 40.5 | 132 | 330 | 0 | 764 | 1140 | 2.0 | 0.5 | 0 | 0.2 |
| L-P3 | Low-heat | 40.0 | 40.5 | 132 | 330 | 0 | 764 | 1140 | 3.0 | 0.5 | 0 | 0.2 |

Explanations of the following symbols:

W: Water (a value when including an admixture as water)

C: Cement, normal portland cement or low-heat portland cement (the cements whose sample name in Table 1 has the first character "N" and whose type is "Normal" are normal portland cements and the cements whose sample name in Table 1 has the first character "L" and whose type is "Low-heat" are low-heat portland cements. (All of these cements are produced by Chichibu Onoda Co., Ltd.)

E: XPAN K (an expanding agent produced by Chichibu Onoda Co., Ltd.).

S: Fine aggregates from Kashima in Ibaraki-ken.

G: Coarse aggregate from Kasama in Ibaraki-ken.

P: Glycol-type shrink-reducing agent produced by Chichibu Onoda Co., Ltd.

5R: Coreflow-NP-5R (a high performance AE water-reducing agent manufactured by Chichibu Onoda Co., Ltd.

D: Delvocreat (a retardant manufactured by Pozolith).

AE: CAE-20 (an AE agent manufactured by Chichibu Onoda Co., Ltd., used as an 1/100 solution)

FIGS. 1 and 2 respectively show the compressive strength of each concrete test sample (concrete composition) shown in Table 1 and FIGS. 3 and 4 respectively show the volume of shrinkage of each concrete test sample shown in Table 1. FIG. 1 is a graph showing a variation in the compressive strength corresponding to the passage of the age of a concrete composition using normal portland cement in each shrink-reducing agent (P) for 100 parts by weight of cement. Also, the compressive strength and also shrinkage factor of the concrete composition are more increased in the case of using 1 part by weight of the shrink-reducing agent (P) than in the case of using 2 parts by weight of the shrink-reducing agent (P) for 100 parts by weight of cement.

Therefore, placing the compressive strength of the concrete composition using no shrink-reducing agent (P) as a standard, the rate of a reduction in the compressive strength of the concrete composition is smaller as the amount of the shrink-reducing agent (P) to be used is reduced However, when the amount of the shrink-reducing agent (P) is reduced, the shrinkage factor is increased.

It is essential to determine the amount of the shrink-reducing agent appropriately to attain the purpose of reducing shrinkage strain with the result that the cured product is prevented from cracking and from being reduced in the strength and further the new surface layer is exfoliated from an existent paved layer with difficulty.

FIGS. 1–4 show that when the shrink-reducing agent (P) is used in an amount of 1–3 parts by weight based on 100 parts of cement, a reduction in the compressive strength of the concrete composition is small and the amount of shrinkage is also small and hence it is desirable to use the shrink-reducing agent (P) in an amount falling within the above range. The amount of the shrink-reducing agent (P) is in a range between more preferably 1 and 2.5 parts by weight and most preferably 1 and 2 parts by weight based on 100 parts by weight of cement.

Next, to confirm the effect in the case of using the expanding agent (E), the amount of the expanding agent (E)

to be used was changed while the amount of the shrink-reducing agent (P) was fixed to the most preferable range, namely 2 parts by weight based on 100 parts by weight of cement, to produce the concrete test samples with the compositions shown in Table 2.

The concrete test samples represented by N-E20 to N-E40 shown in Table 2 are produced by using 2 parts by weight (B×2%) of the shrink-reducing agent (P) in 100 parts by weight (B=330 kg/m³) of each normal portland cement using the expanding agent (E) in amounts of 20 kg/m³, 30 kg/m³, 35 kg/m³ and 40 kg/m³ respectively. While the concrete test samples represented by L-E20 to L-E40 shown in Table 2 are produced by using 2 parts by weight (B×2%) of the shrink-reducing agent (P) in 100 parts by weight (B=330 kg/m³) of each low-heat portland cement using the expanding agent (E) in amounts of 10 kg/m³, 20 kg/m³, 25 kg/m³ and 30 kg/m³ respectively.

While, for instance, the compressive strength of the concrete composition is more reduced in the case of using the expanding agent (E) in an amount of 20 kg/m³ than in an amount of 10 kg/m³ in low-heat portland cement and the volume of expansion is increased on the contrary. The compressive strength of the concrete composition is more reduced in the case of using the expanding agent (E) in an amount of 25 kg/m³ than in an amount of 20 kg/m³ in low-heat portland cement and the volume of expansion is increased on the contrary. Moreover, the compressive strength of the concrete composition is more reduced in the case of using the expanding agent (E) in an amount of 30 kg/m³ than in an amount 25 kg/m³ in low-heat portland cement and the volume of expansion is increased on the contrary.

Accordingly, the compressive strength of the concrete composition is reduced as the amount of the expanding

TABLE 2

| Test sample | Cement Type | W/B (%) | s/a (%) | Unit amount (kg/m³) B | | | | | Admixutre (B × %) | | | |
|---|---|---|---|---|---|---|---|---|---|---|---|---|
| | | | | W | C | E | S | G | P | SR | D | AE |
| N-E20 | Normal | 40.0 | 40.5 | 132 | 310 | 20 | 762 | 1137 | 2.0 | C.4 | 0 | 0.8 |
| N-E30 | Normal | 40.0 | 40.5 | 132 | 300 | 30 | 762 | 1137 | 2.0 | 0.4 | 0 | 0.8 |
| N-E35 | Normal | 40.0 | 40.5 | 132 | 295 | 35 | 762 | 1137 | 2.0 | 0.4 | 0 | 0.8 |
| N-E40 | Normal | 40.0 | 40.5 | 132 | 290 | 40 | 762 | 1137 | 2.0 | 0.4 | 0 | 0.8 |
| L-E10 | Low-heat | 40.0 | 40.5 | 132 | 320 | 10 | 764 | 1140 | 2.0 | 0.5 | 0 | 0.6 |
| L-E20 | Low-heat | 40.0 | 40.5 | 132 | 310 | 20 | 764 | 1140 | 2.0 | 0.5 | 0 | 0.6 |
| L-E25 | Low-heat | 40.0 | 40.5 | 132 | 305 | 25 | 764 | 1140 | 2.0 | 0.5 | 0 | 0.6 |
| L-E30 | Low-heat | 40.0 | 40.5 | 132 | 300 | 30 | 764 | 1140 | 2.0 | 0.5 | 0 | 0.6 |

*Explanations of the symbols are the same as in Table 1.

Figure 5:
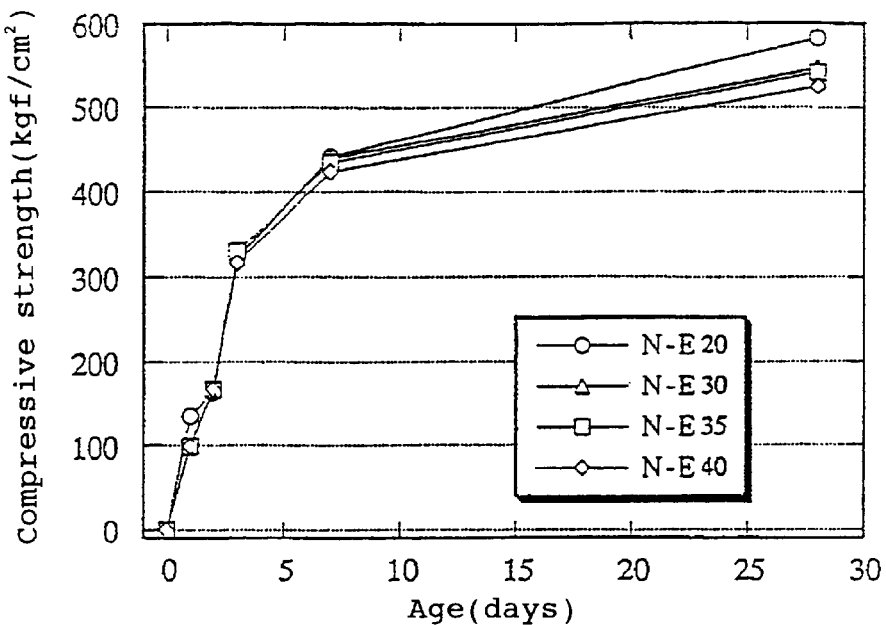
FIG. 5 is a graph showing a variation in the compressive strength corresponding to the passage of the age of a concrete composition using normal portland cement in each amount of an expanding agent to be used.
Figure 6:
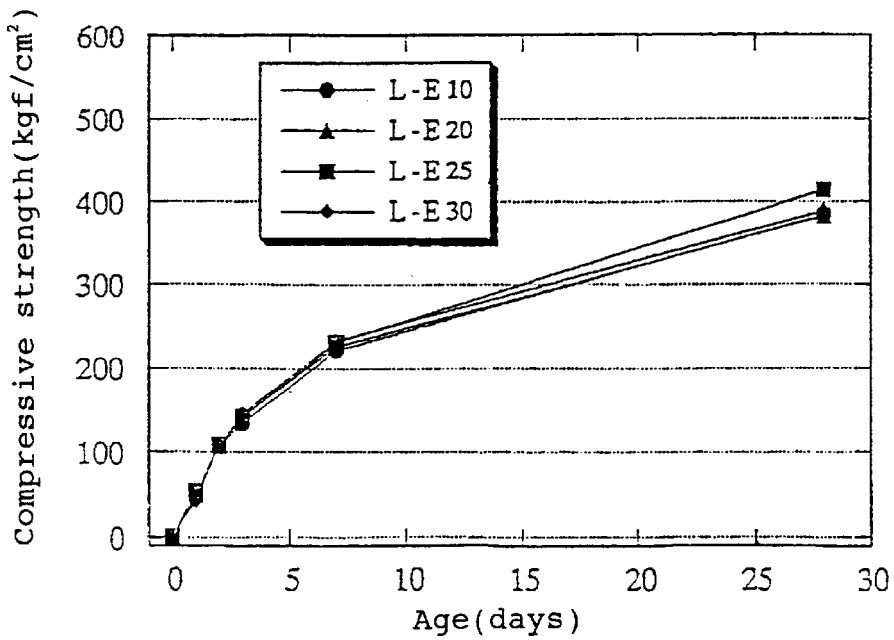
FIG. 6 is a graph showing a variation in the compressive strength corresponding to the passage of the age of a concrete composition using low-heat portland cement in each amount of an expanding agent to be used.
Figure 7:
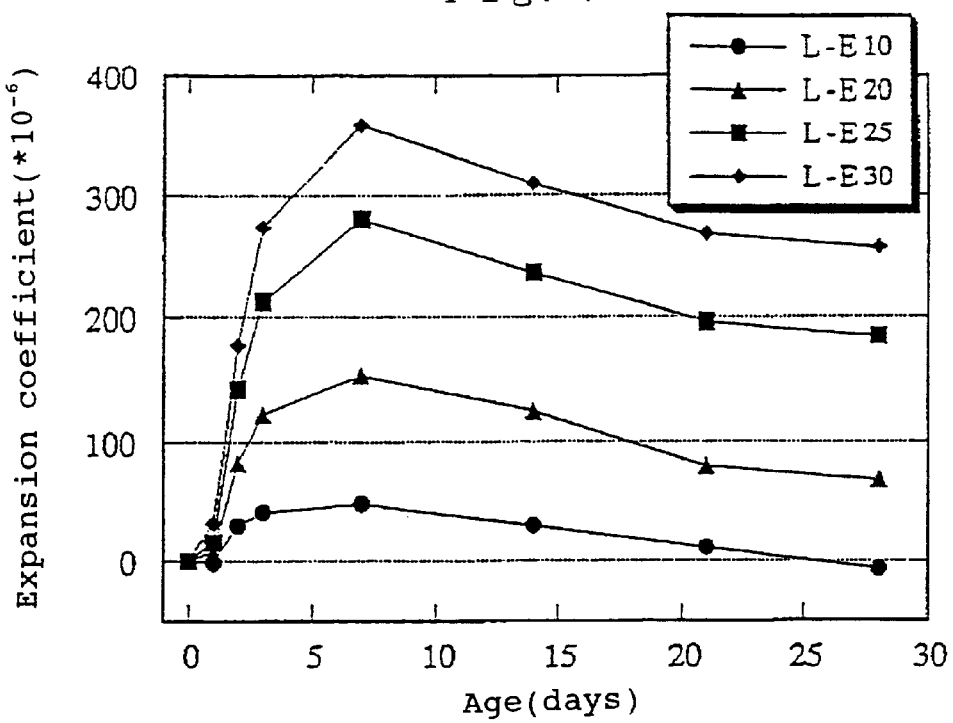
FIG. 7 is a graph showing a variation in the volume of expansion corresponding to the passage of the age of a concrete composition using low-heat portland cement in each amount of an expanding agent to be used.
Figure 8:
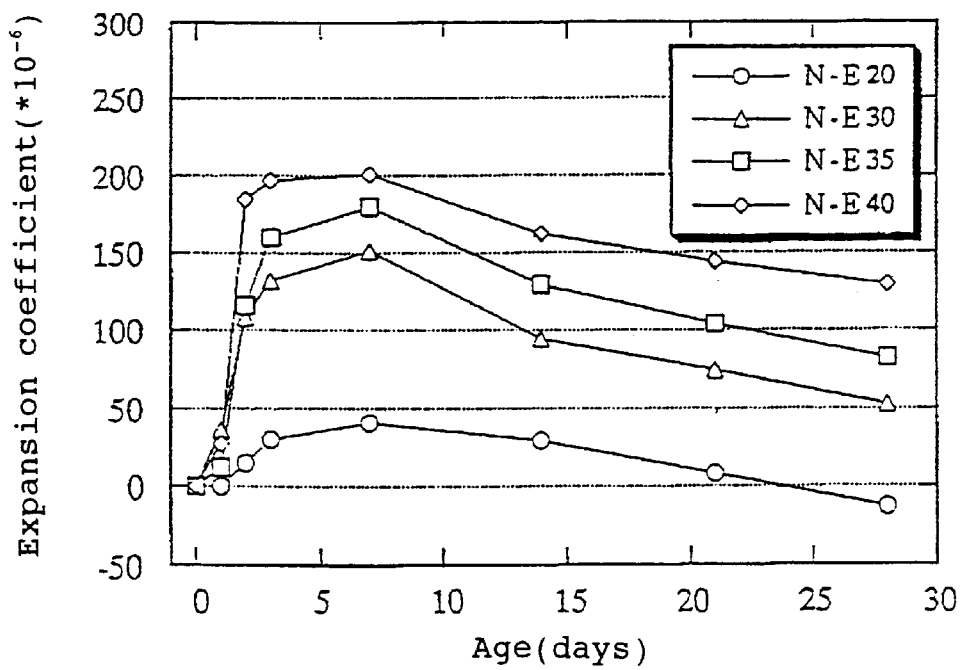
FIG. 8 is a graph showing a variation in the volume of expansion corresponding to the passage of the age of a concrete composition using normal portland cement in each amount of an expanding agent to be used.

FIGS. 5 and 6 and FIGS. 7 and 8 show the compressive strength and volume of expansion of the concrete test samples (concrete compositions) shown in Table 2. FIG. 5 is a graph showing a variation in the compressive strength corresponding to the passage of the age of a concrete composition using normal portland cement in each amount of the expanding agent (E) to be used. FIG. 6 is a graph showing a variation in the compressive strength corresponding to the passage of the age of a concrete composition using low-heat portland cement in each amount of the expanding agent (E) to be used. FIG. 7 is a graph showing a variation in the volume of expansion corresponding to the passage of the age of a concrete composition using low-heat portland cement in each amount of the expanding agent (E) to be used. FIG. 8 is a graph showing a variation in the volume of expansion corresponding to the passage of the age of a concrete composition using normal portland cement in each amount of the expanding agent (E) to be used.

It is found from FIGS. 5 to 8 that the compressive strength and volume of shrinkage vary with the amount of the expanding agent (E) represented by the symbol E in Table 2.

For instance, the compressive strength of the concrete composition is more reduced in the case of using the expanding agent (E) in an amount of 30 kg/m³ than in an amount of 20 kg/m³ in normal portland cement and the volume of expansion is increased on the contrary. The compressive strength of the concrete composition is more reduced in the case of using the expanding agent (E) in an amount of 35 kg/m³ than in an amount of 30 kg/m³ in normal portland cement and the volume of expansion is increased on the contrary. Moreover, the compressive strength of the concrete composition is more reduced in the case of using the expanding agent (E) in an amount of 40 kg/m³ than in an amount of 35 kg/m³ in normal portland cement and the volume of expansion is increased on the contrary.

agent (E) to be used is increased. The volume of expansion of the concrete composition is, in turn, increased with an increase in the amount of the expanding agent (E).

It is essential to design the amount of the expanding agent appropriately to attain the purpose of reducing shrinkage strain with the result that the cured product is prevented from cracking and from being reduced in the strength and further the new surface layer is exfoliated from an existent paved layer with difficulty.

FIGS. 5–8 show that when the expanding agent (E) is used in an amount of 20–40 kg/m³ in the case of normal portland cement, a reduction in the compressive strength of the concrete composition is small and the volume of expansion is appropriate and hence it is desirable to use the expanding agent (E) in an amount falling within the above range. Also, when the expanding agent (E) is used in an amount of 10–30 kg/m³ in the case of low-heat portland cement, a reduction in the compressive strength of the concrete composition is small and the volume of expansion is appropriate and hence it is desirable to use the expanding agent (E) in an amount falling within the above range.

Particularly, it is more preferable that the expanding agent (E) is used in an amount of 25 to 35 kg/m³ in the case of normal portland cement and in an amount of 15 to 25 kg/m³ in the case of low-heat portland cement.

Next, to confirm the effect of the retardant (D) in the case of using normal portland cement as the cement, the proportion of the retardant (D) to 100 parts by weight (B) of normal portland cement was changed while the amount of the shrink-reducing agent (P) was fixed to the most preferable range, namely 2 parts by weight based on 100 parts by weight of cement and the amount of the expanding agent (E) was fixed to the most preferable range, namely 35 kg/m³, to produce the concrete test samples with the compositions shown in Table 3.

The concrete test samples represented by N-D0 to N-D6 shown in Table 3 are produced by using 0 part by weight (B×0%), 0.2 parts by weight (B×0.2%), 0.4 parts by weight (B×0.4%) and 0.6parts by weight (B×0.6%) of the retardant (D) in 100 parts by weight of each normal portland cement respectively.

TABLE 3

| Test sample | Cement Type | W/B (%) | s/a (%) | Unit amount (kg/m³) B | | | | | Admixutre (B × %) | | | |
|---|---|---|---|---|---|---|---|---|---|---|---|---|
| | | | | W | C | E | S | G | P | 5R | D | AE |
| N-D0 | Normal | 40.0 | 40.5 | 132 | 295 | 35 | 762 | 1137 | 2.0 | 0.4 | 0 | 0.4 |
| N-D2 | Normal | 40.0 | 40.5 | 132 | 295 | 35 | 762 | 1137 | 2.0 | 0.4 | 0.2 | 0.4 |
| N-D2 | Normal | 40.0 | 40.5 | 132 | 295 | 35 | 762 | 1137 | 2.0 | 0.4 | 0.4 | 0.4 |
| N-D6 | Normal | 40.0 | 40.5 | 132 | 295 | 35 | 762 | 1137 | 2.0 | 0.4 | 0.6 | 0.4 |

*Explanations of the symbols are the same as in Table 1.

Figure 9:
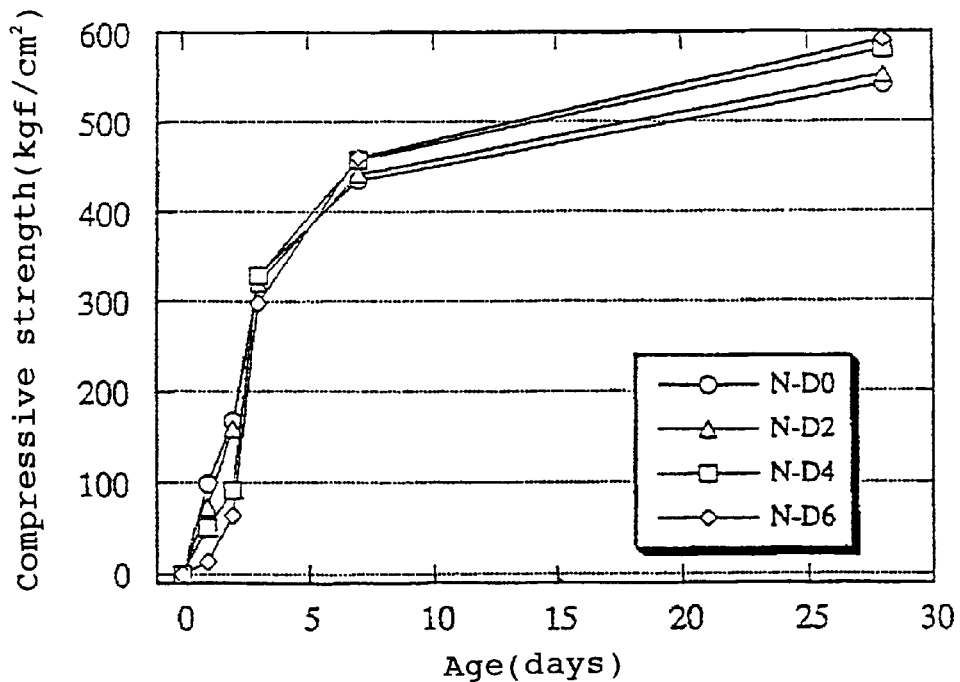
FIG. 9 is a graph showing a variation in the compressive strength corresponding to the passage of the age of a concrete composition using normal portland cement in each amount of a retardant to be used.
Figure 10:
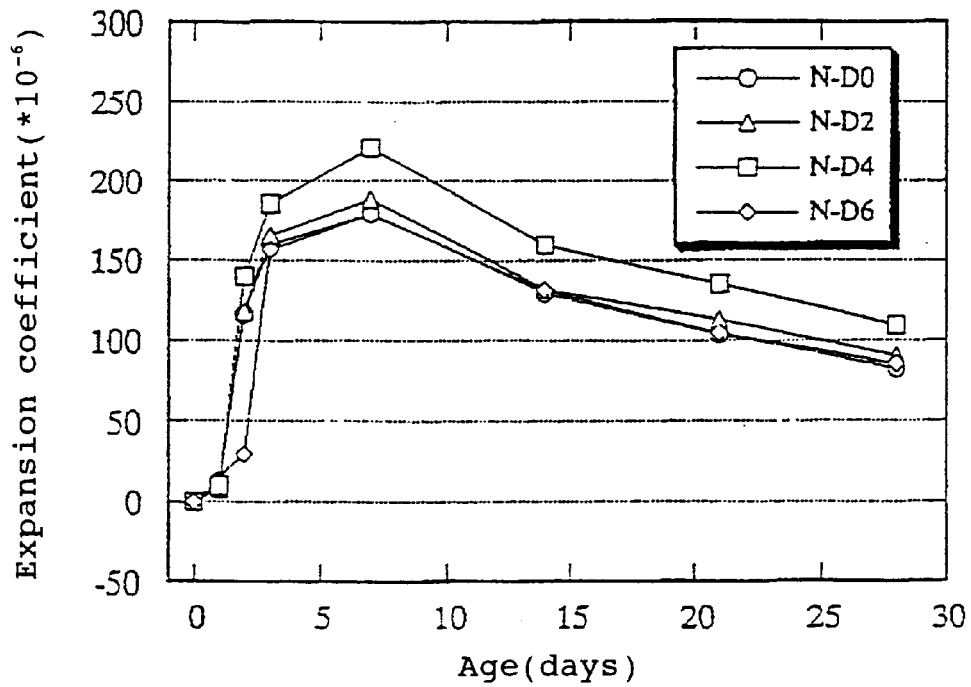
FIG. 10 is a graph showing a variation in the volume of expansion corresponding to the passage of the age of a concrete composition using normal portland cement in each amount of a retardant to be used.

FIGS. 9 and 10 show the compressive strength and volume of expansion of the concrete test samples (concrete compositions) shown in Table 3. FIG. 9 is a graph showing a variation in the compressive strength corresponding to the passage of the age of a concrete composition using normal portland cement in each amount of the retardant (D) to be used. FIG. 10 is a graph showing a variation in the volume of expansion corresponding to the passage of the age of a concrete composition using normal portland cement in each amount of the retardant (D) to be used.

It is found from FIGS. 9 and 10 that the compressive strength and volume of shrinkage vary with the amount of the retardant (D) represented by the symbol D in Table 3.

For instance, the compressive strength of the concrete composition is more increased in the case of using 0.2 parts by weight of the retardant (D) than in the case of using no retardant in 100 parts by weight of cement and the volume of expansion is also increased. The compressive strength of the concrete composition is more increased in the case of using the retardant (D) in an amount of 0.4 parts by weight than in an amount of 0.2 parts by weight in 100 parts by weight of cement and the volume of expansion is also increased. Moreover, the compressive strength of the concrete composition is more increased in the case of using the retardant (D) in an amount of 0.6 parts by weight than in an amount of 0.4 parts by weight and the volume of expansion is reduced on the contrary.

As is clear from the above, the compressive strength of the concrete composition is more increased as the amount of the retardant (D) is increased in comparison with the compressive strength of the concrete composition using no retardant (D). On the other hand, an only increase in the amount of the retardant (D) affords possibility of reducing the volume of expansion of the concrete composition and is hence unsatisfactory. It is therefore to design the amount of the retardant (D) to fall within a proper range.

It is essential to design the amount of the retardant (D) appropriately to attain the purpose of reducing shrinkage strain with the result that the cured product is prevented from cracking and from being reduced in the strength and further the new surface layer is exfoliated from an existent paved layer with difficulty.

It is found from FIGS. 9 and 10 that when the retardant (D) is used in an amount of 0.2 to 0.5 parts by weight in the case of using normal portland cement, the rate of a reduction in the compressive strength of the concrete composition is small and the volume of expansion is appropriate and hence it is desirable to use the retardant (D) in an amount falling within the above range. The retardant (D) is used in an amount of preferably 0.25 to 0.45 parts by weight and most preferably 0.3 to 0.4 parts by weight based on 100 parts by weight of cement.

Next, to confirm the effect of the temperature on the concrete composition of the present invention during curing, the amount of the shrink-reducing agent (P) was fixed to the most preferable range based on the above result, namely 2 parts by weight based on 100 parts by weight of cement, the amount of the expanding agent (E) was fixed to the most preferable range based on the above result, namely 35 kg/m³, and the amount of the retardant (D) was fixed to the most preferable range based on the above result, namely 0.4 parts by weight based on 100 parts by weight of cement, to produce the concrete compositions (test samples 1–5) having the following formulations.

(Test Sample 1)

A concrete composition (test sample 1) having the formulation shown in the following Table 4 was produced. The test sample 1 used normal portland cement as the type of cement and was treated in the curing method in which it was cured in water at 10° C. for 7 days and thereafter in air at 20° C. (humidity: 60%). Incidentally, the test sample 1 was molded 30 minutes after mixing treatment was finished.

TABLE 4

| Cement Type | W/B (%) | s/a (%) | Unit amount (kg/m³) B | | | | | Admixture (B × %) | | | |
|---|---|---|---|---|---|---|---|---|---|---|---|
| | | | W | C | E | S | G | p' | 5R | D | AE |
| Normal | 40.0 | 42.0 | 132 | 295 | 35 | 794 | 1109 | 2.0 | 0.35 | 0 | 0.001 |

Each slump value (in a test made according to JIS A 1101) of the test sample 1 having the above composition just, 30 minutes and 90 minutes after the test sample 1 was kneaded was 7.4 cm, 4.6 cm and 2.8 cm respectively. Each volume of air (in a test made according to JIS A 1128) just, 30 minutes and 90 minutes after the test sample 1 was kneaded was 6.0%, 4.2% and 3.8% respectively.

The characteristics of the test sample 1 obtained in the foregoing manner are shown in Table 5.

TABLE 5

| Age (days) | Compressive strength (kgf/cm$^2$) | Volume of expansion ($\mu$m) |
|---|---|---|
| 1.02 | 38.3 | — |
| 1.77 | 101 | — |
| 1.80 | — | 122 |
| 3.03 | 170 | — |
| 3.04 | — | 285 |
| 5.01 | 250 | — |
| 5.02 | — | 452 |
| 7.00 | 290 | — |
| 7.02 | — | 494 |
| 8.91 | — | 416 |
| 18.0 | — | 363 |

From Table 5, for instance, the compressive strength of the test sample 1 is 38.3 kgf/cm$^2$ at the age of 1.02 days, 101 kgf/cm$^2$ at the age of 1.77 days, 170 kgf/cm$^2$ at the age of 3.03 days, 250 kgf/cm$^2$ at the age of 5.01 days and 290 kgf/cm$^2$ at the age of 7.00 days. So it is found that the compressive strength of the test sample 1 up to the age of 7.00 days at least increases with the age (days), and the compressive strength of the test sample 1 of 3.0 days age is 100 kgf/cm$^2$ or more.

Also, for instance, the volume of expansion of the test sample 1 is 122 $\mu$m at the age of 1.80 days, 285 $\mu$m at the age of 3.04 days, 452 $\mu$m at the age of 5.02 days, 494 $\mu$m at the age of 7.02 days, 416 $\mu$m at the age of 8.91 days and 363 $\mu$m at the age of 18.0 days. It is found that the volume of expansion of the test sample 1 up to the age of 7.02 days increases with the age, but the volume of expansion of the test sample 1 of the age over 7.02 days decreases with the age, and the volume of expansion of the test sample 1 of 7 days age is 200 $\mu$m or more.

Therefore, as to the test sample 1 which uses normal portland cement and is treated in the curing method in which it is cured in water at 10° C. for 7 days and thereafter in air at 20° C. (humidity: 60%), the compressive strength at the age of 3.0 days is 100 kgf/cm$^2$ or more, and the volume of expansion at the age of 7 days is 200 $\mu$m or more.

(Test Sample 2)

A concrete composition (test sample 2) having the formulation shown in the following Table 6 was produced. The test sample 2 used low-heat portland cement as the type of cement and was treated in the curing method in which it was cured in water at 10° C. for 7 days and thereafter in air at 20° C. (humidity: 60%). Incidentally, the test sample 2 was molded 30 minutes after mixing treatment was finished.

TABLE 6

| Cement Type | W/B (%) | s/a (%) | Unit amount (kg/m3) B | | | | | Admixture (B x %) | | | |
|---|---|---|---|---|---|---|---|---|---|---|---|
| | | | W | C | E | S | G | p' | 5R | D | AE |
| Low-heat | 40.0 | 42.0 | 132 | 305 | 25 | 796 | 1111 | 2.0 | 0.4 | 0 | 0.002 |

Each slump value (in a test made according to JIS A 1101) of the test sample 2 having the above composition just, 30 minutes and 90 minutes after the test sample 2 was kneaded was 14.4 cm, 4.8 cm and 3.0 cm respectively. Each volume of air (in a test made according to JIS A 1128) just, 30 minutes and 90 minutes after the test sample 2 was kneaded was 9.4%, 3.6% and 3.5% respectively.

The characteristics of the test sample 2 obtained in the foregoing manner are shown in Table 7.

TABLE 7

| Age (days) | Compressive strength (kgf/cm$^2$) | Volume of expansion ($\mu$m) |
|---|---|---|
| 0.99 | 23.1 | — |
| 1.89 | 60.3 | — |
| 1.90 | — | 96 |
| 3.01 | 86.6 | — |
| 3.03 | — | 226 |
| 5.00 | 133 | — |
| 5.01 | — | 352 |
| 7.01 | 168 | — |
| 7.03 | — | 372 |
| 8.84 | — | 343 |
| 18.0 | — | 287 |

As is clear from Table 7, for instance, the compressive strength of the test sample 2 is 23.1 kgf/cm$^2$ at the age of 0.99 days, 60.3 kgf/cm$^2$ at the age of 1.89 days, 86.6 kgf/cm$^2$ at the age of 3.01 days, 133 kgf/cm$^2$ at the age of 5.00 days and 168 kgf/cm$^2$ at the age of 7.01 days. So it is found that the compressive strength of the test sample 2 up to the age of 7.01 days at least increases with the age (days), and the compressive strength of the test sample 2 of 3.0 days age is 80 kgf/cm$^2$ or more.

Also, for instance, the volume of expansion of the test sample 2 is 96$\mu$m at the age of 1.90 days, 226 $\mu$m at the age of 3.03 days, 352 $\mu$m at the age of 5.01 days, 372 $\mu$m at the age of 7.03 days, 343 $\mu$m at the age of 8.84 days and 287 $\mu$m at the age of 18.0 days. It is found that the volume of expansion of the test sample 2 up to the age of 7.03 days increases with the age, but the volume of expansion of the test sample 2 of the age over 7.03 days decreases with the age, and the volume of expansion of the test sample 2 of 7 days age is 200 $\mu$m or more.

Therefore, as to the test sample 2 which uses low-heat portland cement and is treated in the curing method in which it is cured in water at 10° C. for 7 days and thereafter in air at 20° C. (humidity: 60%), the compressive strength at the age of 3.0 days is 80 kgf/cm$^2$ or more, and the volume of expansion at the age of 7 days is 200 $\mu$m or more.

(Test Sample 3)

A concrete composition (test sample 3) having the formulation shown in the following Table 8 was produced. The test sample 3 used normal portland cement as the type of cement and was treated in the curing method in which it was cured in water at 20° C. for 7 days and thereafter in air at 20° C. (humidity: 60%). Incidentally, the test sample 3 was molded 30 minutes after mixing treatment was finished.

TABLE 8

| Cement Type | W/B (%) | s/a (%) | Unit amount (kg/m³) B | | | | | | Admixture (B × %) | | |
|---|---|---|---|---|---|---|---|---|---|---|---|
| | | | W | C | E | S | G | p' | 5R | D | AE |
| Normal | 40.0 | 42.0 | 132 | 295 | 35 | 794 | 1109 | 2.0 | 0.3 | 0.4 | 0.003 |

Each slump value (in a test made according to JIS A 1101) of the test sample 3 having the above composition just, 30 minutes and 90 minutes after the test sample 3 was kneaded was 13.3 cm, 4.8 cm and 2.5 cm respectively. Each volume of air (in a test made according to JIS A 1128) just, 30 minutes and 90 minutes after the test sample 3 was kneaded was 8.0%, 4.3% and 4.0% respectively.

The characteristics of the test sample 3 obtained in the foregoing manner are shown in Table 9.

TABLE 9

| Age (days) | Compressive strength (kgf/cm²) | Volume of expansion (μm) |
|---|---|---|
| 1.07 | — | 100 |
| 1.08 | 80.1 | — |
| 2.05 | 184 | — |
| 2.06 | — | 300 |
| 3.00 | 256 | — |
| 3.01 | — | 391 |
| 5.06 | — | 432 |
| 7.27 | 387 | — |
| 7.35 | — | 437 |
| 10.4 | — | 401 |
| 13.1 | — | 374 |

TABLE 9-continued

| Age (days) | Compressive strength (kgf/cm²) | Volume of expansion (μm) |
|---|---|---|
| 18.0 | — | 355 |
| 28.2 | 507 | — |

As is clear from Table 9, for instance, the compressive strength of the test sample 3 is 80.1 kgf/cm² at the age of 1.08 days, 184 kgf/cm² at the age of 2.05 days, 256 kgf/cm² at the age of 3.00 days, 387 kgf/cm² at the age of 7.27 days, and 507 kgf/cm² at the age of 28.2 days. So it is found that the compressive strength of the test sample 3 up to the age of 28.2 days at least increases with the age (days) and the compressive strength of the test sample 3 of 3.0 days age is 100 kgf/cm² or more.

Also, for instance, the volume of expansion of the test sample 3 is 100 μm at the age of 1.07 days, 300 μm at the age of 2.06 days, 391 μm at the age of 3.01 days, 432 μm at the age of 5.06 days, 437 μm at the age of 7.35 days, 401 μm at the age of 10.4 days, 374 μm at the age of 13.1 days and 355 μm at the age of 18.0 days. It is found that the volume of expansion of the test sample 3 up to the age of 7.35 days increases with the age, but the volume of expansion of the test sample 3 of the age over 7.35 days decreases with the age, and the volume of expansion of the test sample 3 of 7 days age is 200 μm or more.

Therefore, as to the test sample 3 which uses normal portland cement and is treated in the curing method in which it is cured in water at 20° C. for 7 days and thereafter in air at 20° C. (humidity: 60%), the compressive strength at the age of 3.0 days is 100 kgf/cm² or more and the volume of expansion at the age of 7 days is 200 μm or more.

(Test Sample 4)

A concrete composition (test sample 4) having the formulation shown in the following Table 10 was produced. The test sample 4 used low-heat portland cement as the type of cement and was treated in the curing method in which it was cured in water at 20° C. for 7 days and thereafter in air at 20° C. (humidity: 60%). Incidentally, the test sample 4 was molded 30 minutes after mixing treatment was finished.

TABLE 10

| Cement Type | W/B (%) | s/a (%) | Unit amount (kg/m³) B | | | | | | Admixture (B × %) | | |
|---|---|---|---|---|---|---|---|---|---|---|---|
| | | | W | C | E | S | G | p' | 5R | D | AE |
| Low-heat | 40.0 | 42.0 | 132 | 305 | 25 | 796 | 1111 | 2.0 | 0.35 | 0 | 0.003 |

Each slump value (in a test made according to JIS A 1101) of the test sample 4 having the above composition just, 30 minutes and 90 minutes after the test sample 4 was kneaded was 13.5 cm, 4.3 cm and 2.6 cm respectively. Each volume of air (in a test made according to JIS A 1128) just, 30 minutes and 90 minutes after the test sample 4 was kneaded was 10.0%, 3.7% and 3.3% respectively.

The characteristics of the test sample 4 obtained in the foregoing manner are shown in Table 11.

TABLE 11

| Age (days) | Compressive strength (kgf/cm²) | Volume of expansion (μm) |
|---|---|---|
| 1.03 | 65.8 | — |
| 1.07 | — | 85 |
| 1.99 | 101 | — |
| 2.00 | — | 289 |
| 2.98 | 122 | — |
| 3.01 | — | 403 |
| 4.91 | — | 456 |

TABLE 11-continued

| Age (days) | Compressive strength (kgf/cm$^2$) | Volume of expansion ($\mu$m) |
| --- | --- | --- |
| 7.13 | 213 | — |
| 7.21 | — | 456 |
| 10.3 | — | 429 |
| 12.9 | — | 417 |
| 17.9 | — | 391 |
| 27.9 | — | 369 |
| 28.1 | 354 | — |

As is clear from Table 11, for instance, the compressive strength of the test sample 4 is 65.8 kgf/cm$^2$ at the age of 1.03 days, 101 kgf/cm$^2$ at the age of 1.99 days, 122 kgf/cm$^2$ at the age of 2.98 days, 213 kgf/cm$^2$ at the age of 7.13 days and 354 kgf/cm$^2$ at the age of 28.1 days. So it is found that the compressive strength of the test sample 4 up to the age of 28.1 days at least increases with the age (days) and the compressive strength of the test sample 4 of 3.0 days age is 100 kgf/cm$^2$ or more.

Also, for instance, the volume of expansion of the test sample 4 is 85 $\mu$m at the age of 1.07 days, 289 $\mu$m at the age of 2.00 days, 403 $\mu$m at the age of 3.01 days, 456 $\mu$m at the age of 4.91 days, 456 $\mu$m at the age of 7.21 days, 429 $\mu$m at the age of 10.3 days, 417 $\mu$m at the age of 12.9 days, 391 $\mu$m at the age of 17.9 days and 369 $\mu$m at the age of 27.9 days. It is found that the volume of expansion of the test sample 4 up to the age of 4.91 days increases with the age, but the volume of expansion of the test sample 4 of the age over 7.21 days decreases with the age, with a peak between the age of 4.91 days and the age of 7.21 days, and the volume of expansion of the test sample 4 of 7 days age is 200 $\mu$m or more.

Therefore, as to the test sample 4 which uses low-heat portland cement and is treated in the curing method in which it is cured in water at 20° C. for 7 days and thereafter in air at 20° C. (humidity: 60%), the compressive strength at the age of 3.0 days is 100 kgf/cm$^2$ or more, and the volume of expansion at the age of 7 days is 200 $\mu$m or more.

(Test Sample 5)

A concrete composition (test sample 5) having the formulation shown in the following Table 12 was produced. The test sample 5 used low-heat portland cement as the type of cement and was treated in the curing method in which it was cured in water at 35° C. for 7 days and thereafter in air at 20° C. (humidity: 60%). Incidentally, the test sample 5 was molded 30 minutes after mixing treatment was finished.

TABLE 12

| Cement Type | W/B (%) | s/a (%) | Unit amount (kg/m$^3$) B | | | | | Admixture (B × %) | | | |
| --- | --- | --- | --- | --- | --- | --- | --- | --- | --- | --- | --- |
| | | | W | C | E | S | G | p' | 5R | D | AE |
| Low-heat | 40.0 | 42.0 | 132 | 305 | 25 | 796 | 1111 | 2.0 | 0.68 | 0 | 0.004 |

Each slump value (in a test made according to JIS A 1101) of the test sample 5 having the above composition just, 30 minutes and 90 minutes after the test sample 5 was kneaded was 15.5 cm, 5.5 cm and 3.0 cm respectively. Each volume of air (in a test made according to JIS A 1128) just, 30 minutes and 90 minutes after the test sample 5 was kneaded was 8.5%, 3.7% and 3.4% respectively.

The characteristics of the test sample 5 obtained in the foregoing manner are shown in Table 13.

TABLE 13

| Age (days) | Compressive strength (kgf/cm$^2$) | Volume of expansion ($\mu$m) |
| --- | --- | --- |
| 0.99 | 107 | — |
| 1.00 | — | 125 |
| 1.90 | — | 203 |
| 1.92 | 182 | — |
| 3.22 | 229 | — |
| 3.24 | — | 209 |
| 4.88 | — | 231 |
| 7.21 | 315 | — |
| 7.28 | — | 224 |
| 10.3 | — | 177 |
| 13.2 | — | 170 |
| 20.3 | — | 174 |
| 25.1 | 510 | — |
| 25.2 | — | 168 |

As is clear from Table 13, for instance, the compressive strength of the test sample 5 is 107 kgf/cm$^2$ at the age of 0.99 days, 182 kgf/cm$^2$ at the age of 1.92 days, 229 kgf/cm$^2$ at the age of 3.22 days, 315 kgf/cm$^2$ at the age of 7.21 days and 510 kgf/cm$^2$ at the age of 25.1 days. So it is found that the compressive strength of the test sample 5 up to the age of 25.1 days at least increases with the age (days) and the compressive strength of the test sample 5 of 3.0 days age is 100 kgf/cm$^2$ or more.

Also, for instance, the volume of expansion of the test sample 5 is 125 $\mu$m at the age of 1.00 days, 203 $\mu$m at the age of 1.90 days, 209 $\mu$m at the age of 3.24 days, 231 $\mu$m at the age of 4.88 days, 224 $\mu$m at the age of 7.28 days, 177 $\mu$m at the age of 10.3 days, 170 $\mu$m at the age of 13.2 days, 174 $\mu$m at the age of 20.3 days and 168 $\mu$m at the age of 25.2 days. It is found that the volume of expansion of the test sample 5 up to the age of 4.88 days increases with the age, but the volume of expansion of the test sample 5 of the age over 7.28 days decreases with the age, with a peak between the age of 4.88 days and the age of 7.28 days, and the volume of expansion of the test sample 5 of 7 days age is 200 $\mu$m or more.

Therefore, as to the test sample 5 which uses low-heat portland cement and is treated in the curing method in which it is cured in water at 35° C. for 7 days and thereafter in air at 20° C. (humidity: 60%), the compressive strength at the age of 3.0 days is 100 kgf/cm$^2$ or more, and the volume of expansion at the age of 7 days is 200 $\mu$m or more.

From the test results of each test samples, the shrink-agent is used in the concrete composition for an overlay method of construction according to the present invention in an amount of 1 to 3 parts by weight, preferably 1 to 2.5 parts by weight and more preferably 1 to 2 parts by weight based on 100 parts by weight of cement. The amount of the expanding agent used in the concrete composition for an overlay method of construction according to the present invention is 10 to 30 kg/m$^3$ preferably 20 to 40 kg/m$^3$ and particularly preferably 25 to 35 kg/m³. The amount of the high performance AE water-reducing agent used in the concrete composition for an overlay method of construction according to the present invention is preferably 0.3 to 1 part by weight and particularly preferably 0.4 to 0.8 parts by weight. The amount of the AE agent used in the concrete composition for an overlay method of construction according to the present invention is preferably 0.001 to 0.015 parts by weight and particularly preferably 0.002 to 0.012 parts by weight based on 100 parts by weight of cement. The amount of the retardant used in the concrete composition for an overlay method of construction according to the present invention is preferably 0.2 to 0.5 parts by weight, more preferably 0.25 to 0.45 parts by weight and particularly preferably 0.3 to 0.4 parts by weight based on 100 parts by weight of normal portland cement.

It is desirable that the concrete composition for an overlay method of construction have a slump value of 1 to 5 cm and particularly 2 to 4 cm (in a test made according to JIS A 1101) 90 minutes after it is kneaded and an air volume of 2.5 to 6.5% and particularly 3 to 6% (in a test made according to JIS A 1128) because of the following reasons. When the slump value is less than 1 cm, the fluidity of the composition is impaired and the flow of the composition into an irregular plane of the surface is not good, reducing binding unity that much more. On the contrary, when the slump value exceeds 5 cm, the concrete composition is too softened, causing sagging of the composition when it is applied to a slope. While, when the volume of air is less than 2.5%, the freeze and fusion resistances are impaired, causing cracking. On the other hand, when the volume of air exceeds 6.5%, a contact area with an irregular plane of the surface is reduced, reducing binding unity that much more. Specifically, when the slump value 90 minutes after the composition is tempered falls within a range between 1 and 5 cm and particularly 2 to 4 cm and the volume of air falls within a range between 2.5 and 6.5% and particularly 3 and 6%, the bonding strength between an existent paved layer and a new surface layer is more improved, cracking is caused with difficulty and further the workability is improved.

Moreover, a cured product produced by curing the above concrete composition for an overlay method of construction according to the present invention attains at the same time each prescribed value of compressive strength and volume of expansion. Specifically, the compressive strength of a cured product of 3 days age reaches a prescribed value, namely 80 kgf/cm² or more (in a test made according to JIS A 1108) and at the same time the volume of expansion of a cured product of 7 days age reaches a prescribed value, namely 200 µm or more (in a test made according to JIS A 6202) with a great deal of satisfaction. Particularly in the case of performing water-curing at 20° C. or more when the composition is cured, the compressive strength of the cured product of 3 days age reaches a prescribed value, namely 100 kgf/cm² or more (in a test made according to JIS A 1108) and at the same time the volume of expansion of the cured product of 7 days age reaches a prescribed value, namely 200 µm or more (in a test made according to JIS A 6202) with a great deal of satisfaction.

The compressive strength of a cured product of 3 days age as to the concrete composition for an overlay method of the present invention is 80 kgf/cm² or more. Especially, the compressive strength of a cured product of 3 days age as to the concrete composition for an overlay method of the present invention is 100 kgf/cm² or more when water-curing is performed at 20° C. or more in curing. To state in more detail, the compressive strength of a cured product of 3 days age as to the concrete composition for an overlay method of the present invention is in a range between 100 and 400 kgf/cm² (in a test made according to JIS A 1108) when water-curing is performed at 20° C. or more in curing. The volume of expansion of a cured product of 7 days age according to the present invention is 200 µm or more, specifically, 200 to 500 µm (in a test made according to JIS A 6202).

As stated above, the use of the concrete composition for an overlay method according to the present invention and the cured product thereof enables it possible to form a surface layer which is rich in bonding strength between an existent paved layer and the surface layer as a new surface layer, exfoliates with difficulty and is resistant to cracking for a new surface layer formed on an existent paved layer and to wear.

Although the present invention has been explained by the test results of the test examples, the present invention is not limited to the compositions of these test samples.

What is claimed is:

1. A concrete composition for an overlay method of construction, comprising:
    a low heat portland cement;
    a shrink-reducing agent in an amount of 1 to 3 parts by weight based on 100 parts by weight of the cement;
    an expanding agent in an amount of 10 to 30 kg/m³;
    a high performance AE water-reducing agent in an amount of 0.3 to 1 parts by weight based on 100 parts by weight of the cement; and
    an AE agent in an amount of 0.001 to 0.015 parts by weight based on 100 parts by weight of the cement.

2. A concrete composition for an overlay method of construction, comprising:
    a normal portland cement;
    a shrink-reducing agent in an amount of 1 to 3 parts by weight based on 100 parts by weight of the cement;
    an expanding agent in an amount of 20 to 40 kg/m³;
    a high performance AE water-reducing agent in an amount of 0.3 to 1 parts by weight based on 100 parts by weight of the cement;
    an AE agent in an amount of 0.001 to 0.015 parts by weight based on 100 parts by weight of the cement; and
    a retardant in an amount of 0.2 to 0.5 parts by weight based on 100 parts by weight of the cement.

3. The concrete composition according to claim 2, wherein said shrink-reducing agent comprises a glycol-containing compound, and said high performance AE water-reducing agent comprises a carboxylic acid compound.

4. The concrete composition according to claim 2, wherein a slump value and volume of air of said composition 90 minutes after said composition is kneaded are 1 to 5 cm in a test made according to JIS A 1101, and 2.5 to 6.5% in a test made according to JIS A 1128, respectively.

5. The concrete composition according to claim 3, wherein said composition is cured.

6. The concrete composition according to claim 5, wherein compressive strength of said cured composition of 3 days age is 80 kgf/cm² or more in a test made according to JIS A 1108, and the volume of expansion of said cured composition of 7 days age is 200 µm or more in a test made according to JIS A 6202.

7. The concrete composition according to claim 6, wherein compressive strength of said cured composition of 3 days age is 100 kgf/cm² or more in a test made according to JIS A 1108 when said composition is cured in water at 20° C. for 7 days and subsequently in air at 20° C. and 60% humidity.

8. The concrete composition according to claim 1, wherein said shrink-reducing agent comprises a glycol-containing compound, and said high performance AE water-reducing agent comprises a carboxylic acid compound.

9. The concrete composition according to claim 1, wherein a slump value and volume of air of said composition 90 minutes after said composition is kneaded are 1 to 5 cm in a test made according to JIS A 1101, and 2.5 to 6.5% in a test made according to JIS A 1128, respectively.

10. The concrete composition according to claim 1, wherein said composition is cured.

11. The concrete composition according to claim 10, wherein compressive strength of said cured composition of 3 days age is 80 kgf/cm$^2$ or more in a test made according to JIS A 1108, and volume of expansion of said cured composition of 7 days age is 200 $\mu$m or more in a test made according to JIS A 6202.

12. The concrete composition according to claim 11, wherein compressive strength of said cured composition of 3 days age is 100 kgf/cm$^2$ or more in a test made according to JIS A 1108 when said composition is cured in water at 20° C. for 7 days and subsequently in air at 20° C. and 60% humidity.

* * * * *

UNITED STATES PATENT AND TRADEMARK OFFICE
CERTIFICATE OF CORRECTION

PATENT NO. : 6,372,038 B1
DATED : April 16, 2002
INVENTOR(S) : Shoichi Kameta et al.

It is certified that error appears in the above-identified patent and that said Letters Patent is hereby corrected as shown below:

<u>Title page,</u>
Item [54], please change the title to read:

-- CONCRETE COMPOSITION FOR OVERLAY METHOD OF CONSTRUCTION AND CURED PRODUCT THEREOF --

Signed and Sealed this

Seventeenth Day of September, 2002

*Attest:*

*Attesting Officer*

JAMES E. ROGAN
*Director of the United States Patent and Trademark Office*